US012574191B2

(12) United States Patent
Matsumura et al.

(10) Patent No.: US 12,574,191 B2
(45) Date of Patent: Mar. 10, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 423 days.

(21) Appl. No.: 18/005,256

(22) PCT Filed: Jul. 31, 2020

(86) PCT No.: PCT/JP2020/029472

§ 371 (c)(1),
(2) Date: Jan. 12, 2023

(87) PCT Pub. No.: WO2022/024357

PCT Pub. Date: Feb. 3, 2022

(65) Prior Publication Data

US 2023/0308249 A1     Sep. 28, 2023

(51) Int. Cl.
H04W 4/00          (2018.01)
H04L 5/00          (2006.01)
(52) U.S. Cl.
CPC .......... H04L 5/0094 (2013.01); H04L 5/0053 (2013.01)
(58) Field of Classification Search
CPC ... H04L 5/0094; H04L 5/0053; H04L 5/0035; H04W 72/04
See application file for complete search history.

(56) References Cited

U.S. PATENT DOCUMENTS

| | | | | | |
|---|---|---|---|---|---|
| 10,826,568 | B1 * | 11/2020 | Zhou | ...................... | H04B 7/088 |
| 2020/0119778 | A1 * | 4/2020 | Grant | ................... | H04B 7/0617 |
| 2020/0169991 | A1 * | 5/2020 | Lin | ........................ | H04W 72/56 |
| 2020/0196383 | A1 * | 6/2020 | Tsai | ...................... | H04W 76/11 |
| 2020/0350957 | A1 * | 11/2020 | Zhou | ...................... | H04B 7/088 |
| 2021/0385800 | A1 | 12/2021 | Harada et al. | | |
| 2023/0076897 | A1 * | 3/2023 | Svedman | .............. | H04L 5/0094 |

(Continued)

FOREIGN PATENT DOCUMENTS

| | | | |
|---|---|---|---|
| KR | 10-2020-0020272 A | 2/2020 |
| WO | 2020059153 A1 | 3/2020 |

(Continued)

OTHER PUBLICATIONS

Office Action issued in Japanese Application No. 2022-539953, mailed Nov. 19, 2024 (4 pages).

(Continued)

*Primary Examiner* — Thai Dinh Hoang
(74) *Attorney, Agent, or Firm* — Osha Bergman Watanabe & Burton LLP

(57) ABSTRACT

A terminal according to an aspect of the present disclosure includes a receiving section that receives information associating a plurality of physical downlink control channel (PDCCH) candidates with respectively a plurality of different transmission configuration indication (TCI) states, and a control section that monitors at least one of the plurality of PDCCH candidates by use of a corresponding TCI state, based on the information. According to an aspect of the present disclosure, a PDCCH can be appropriately received.

6 Claims, 20 Drawing Sheets

(56) References Cited

U.S. PATENT DOCUMENTS

2023/0379071 A1 *  11/2023  Yuan ..................... H04W 72/20
2024/0008024 A1 *   1/2024  Jung ..................... H04L 1/1812

FOREIGN PATENT DOCUMENTS

WO      WO-2022029316 A1 *  2/2022   ........... H04L 5/0053
WO      WO-2022211571 A1 * 10/2022   ........... H04W 72/23

OTHER PUBLICATIONS

Office Action issued in Japanese Application No. 2022-539953, dated Jul. 2, 2024 (6 pages).
Office Action issued in Chinese Application No. 202080105546.7, dated Aug. 22, 2024 (17 pages).
Office Action issued in Chinese Patent Application No. 202080105546.7, issued May 1, 2025 (22 pages).
BGPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)" Mar. 2010 (149 pages).
International Search Report issued in International Application No. PCT/JP2020/029472, mailed Feb. 9, 2021 (5 pages).
Written Opinion issued in International Application No. PCT/JP2020/029472; Dated Feb. 9, 2021 (3 pages).
Office Action issued in Chinese Patent Application No. 202080105546.7, dated Oct. 16, 2025 (24 pages).

* cited by examiner

FIG. 4B
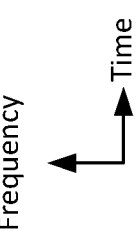
search space
PDCCH candidate
Frequency
Time
FIG. 4A
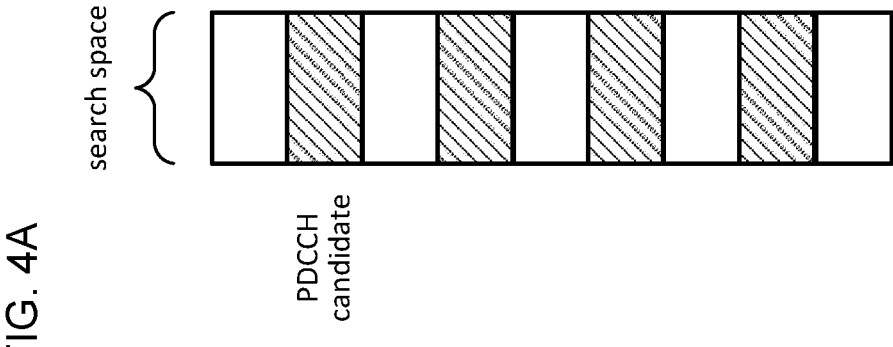
search space
PDCCH candidate
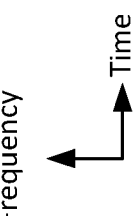
Frequency
Time

Figures 6A, 6B:
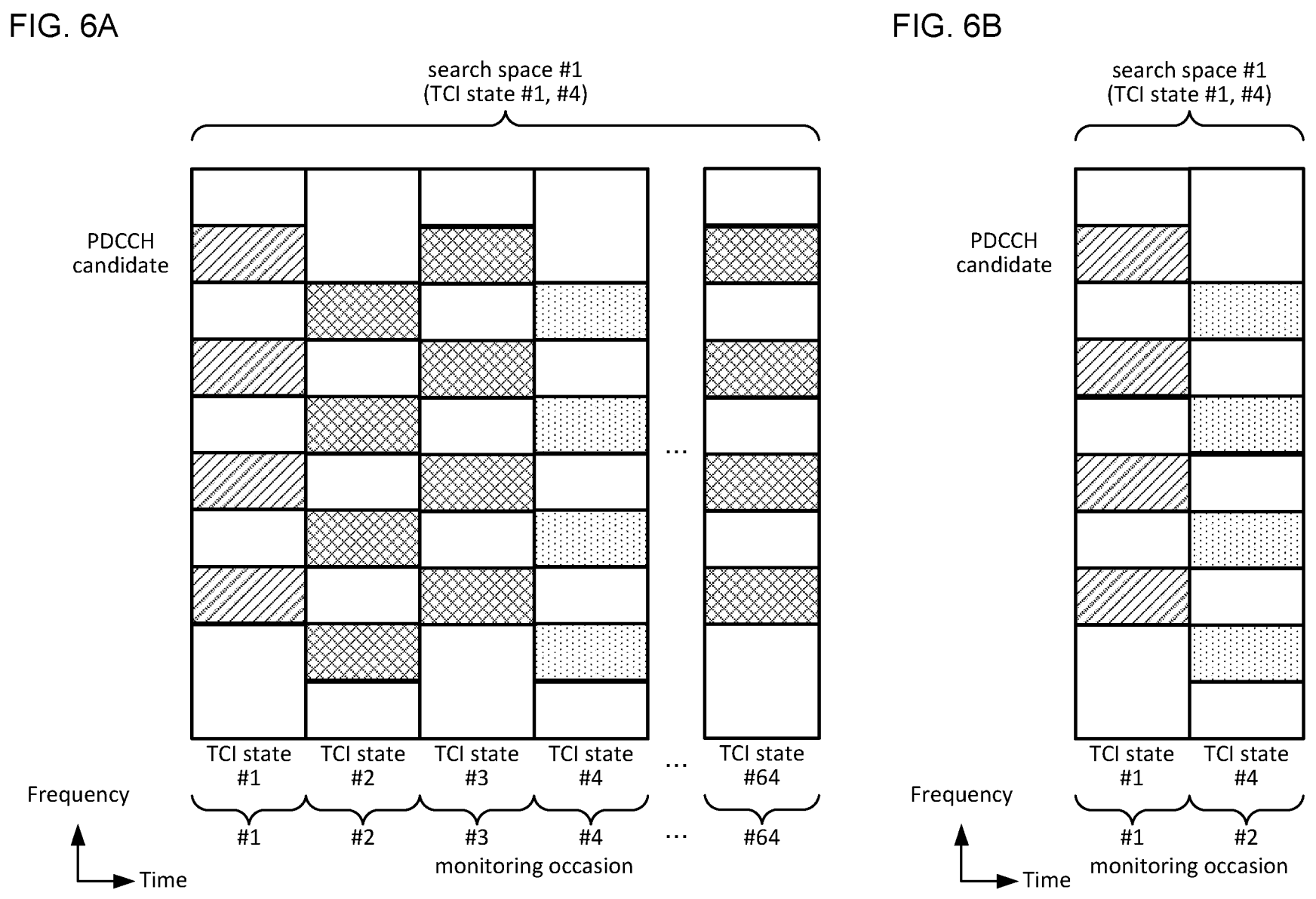

FIG. 6B search space #1
(TCI state #1, #4)

PDCCH
candidate

TCI state #1     TCI state #4
1              #2
monitoring occasion

Frequency     Time

FIG. 6A search space #1
(TCI state #1, #4)

PDCCH
candidate

TCI state #1     TCI state #2     TCI state #3     TCI state #4     TCI state #64
1              #2              #3              #4              #64
monitoring occasion Frequency     Time Enhanced TCI States Activation/Deactivation for
UE-specific PDCCH MAC CE Enhanced TCI States Activation/Deactivation for
UE-specific PDCCH MAC CE

| Serving Cell ID | | | Search Space ID | | Oct. 1 |
| Search Space ID | R | R | R | R | R | Oct. 2 |
| R | TCI state ID | | | | | Oct. 3 |

Enhanced TCI States Activation/Deactivation for
UE-specific PDCCH MAC CE

| Serving Cell ID | | | | Search Space ID | | Oct. 1 |
|---|---|---|---|---|---|---|
| Search Space ID | R | R | R | R | R | Oct. 2 |
| R | TCI state ID$_1$ | | | | | Oct. 3 |
| C | TCI state ID$_2$ | | | | | Oct. 4 |

FIG. 14

Enhanced TCI States Activation/Deactivation for
UE-specific PDCCH MAC CE

Additional TCI States Activation/Deactivation for
UE-specific PDCCH MAC CE

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In a future radio communication system (for example, NR), a user terminal (terminal, User Equipment (UE)) monitors PDCCH candidates.

How to improve performance of a PDCCH is not clear. If the performance of a PDCCH is not improved, communication quality or throughput may be prevented from improving.

As such, an object of the present disclosure is to provide a terminal, a radio communication method, and a base station capable of appropriately receiving a PDCCH.

Solution to Problem

A terminal according to an aspect of the present disclosure includes a receiving section that receives information associating a plurality of physical downlink control channel (PDCCH) candidates with a plurality of different transmission configuration indication (TCI) states, respectively, and a control section that monitors at least one of the plurality of PDCCH candidates by use of a corresponding TCI state, based on the information.

Advantageous Effects of Invention

According to an aspect of the present disclosure, a PDCCH can be appropriately received.

BRIEF DESCRIPTION OF DRAWINGS

FIGS. 4A and 4B are diagrams to show an example of PDCCH candidates using PDCCH candidate resources in accordance with Rel. 15/16;

FIGS. 6A and 6B are diagrams to show an example of a plurality of PDCCH candidates respectively associated with a plurality of monitoring occasions within one search space;

FIG. 14 is a diagram to show an example of Variation 1 of the MAC CE 2;

Figure 1:
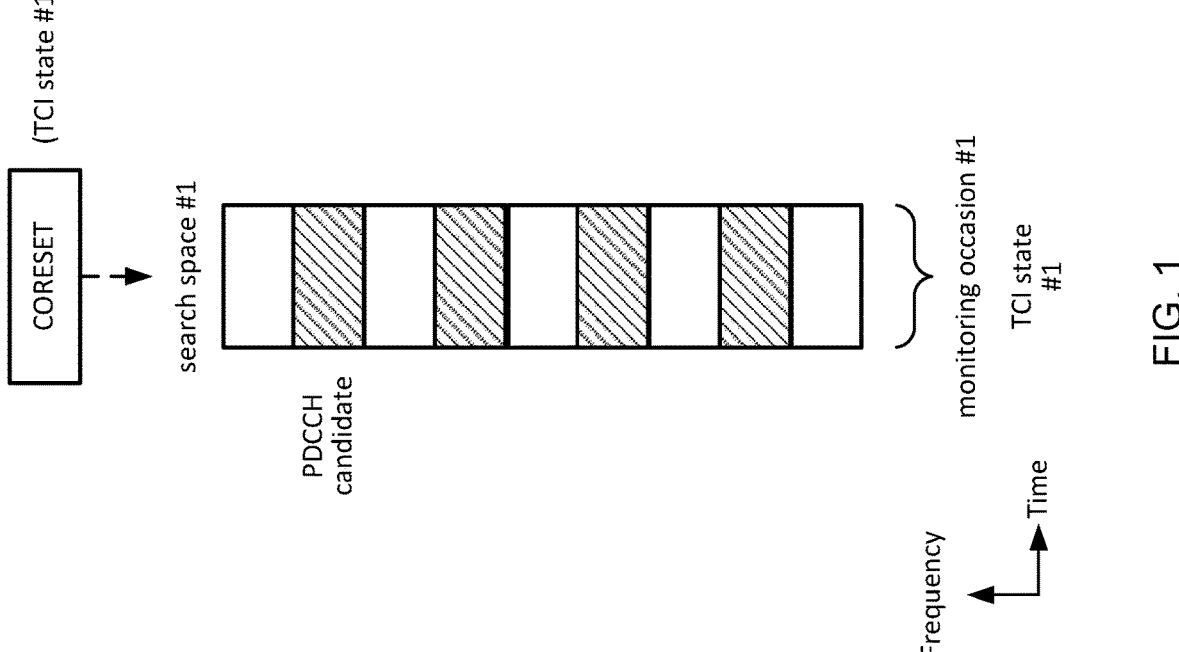
FIG. 1 is a diagram to show an example of association between a PDCCH candidate and a search space.

DESCRIPTION OF EMBODIMENTS (TCI, Spatial Relation, QCL)

For NR, a study is underway to control reception processing (for example, at least one of reception, demapping, demodulation, and decoding) and transmission processing (for example, at least one of transmission, mapping, precoding, modulation, and coding) of at least one of a signal and a channel (referred to as a signal/channel) in a UE on the basis of a transmission configuration indication state (TCI state).

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information, or the like. The TCI state may be configured for the UE for each channel or for each signal.

QCL is an indicator indicating statistical properties of the signal/channel. For example, when a given signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter (s)) are described below:

QCL type A (QCL-A): Doppler shift, Doppler spread, average delay, and delay spread, QCL type B (QCL-B): Doppler shift and Doppler spread, QCL type C (QCL-C): Doppler shift and average delay, QCL type D (QCL-D): Spatial reception parameter.

A case that the UE assumes that a control resource set (CORESET), channel, or reference signal has a specific QCL (for example, QCL type D) relation with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (in other words, a reference signal (RS) for the channel) and another signal (for example, another RS). The TCI state may be configured (indicated) by higher layer signaling or physical layer signaling, or a combination of these.

The physical layer signaling may be, for example, downlink control information (DCI).

A channel for which the TCI state or the spatial relation is configured (indicated) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS to have a QCL relation with the channel may be, for example, at least one of a synchronization signal block (SSB), a channel state information reference signal (CSI-RS), a reference signal for measurement (sounding reference signal (SRS)), a tracking CSI-RS (also referred to as a tracking reference signal (TRS)), and a QCL detection reference signal (also referred to as a QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

A QCL type X RS in a TCI state may mean an RS having a QCL type X relation with (a DMRS of) a channel/signal, and the RS may be referred to as a QCL source for the QCL type X in the TCI state.

(Default TCI State/Default Spatial Relation/Default PL-RS)

In an RRC connected mode, in both a case that information of TCI in DCI (higher layer parameter "TCI-PresentIn-DCI") is set as "enabled" and a case that the information of TCI in DCI is not configured, in a case that a time offset between reception of the DL DCI (the DCI scheduling the PDSCH) and the corresponding PDSCH (the PDSCH scheduled by the DCI) is less than a threshold (timeDuration-ForQCL) (application condition, first condition), in a case of non cross-carrier scheduling, the TCI state of the PDSCH (default TCI state) may be the TCI state having the lowest CORESET ID in the most recent slot in the active DL BWP of a CC thereof (of a specific UL signal). Otherwise, the TCI state of the PDSCH (default TCI state) may be the TCI state having the lowest TCI state ID of the PDSCH in the active DL BWP of the scheduled CC.

In Rel. 15, individual MAC CEs, specifically a PUCCH spatial relation activation/deactivation MAC CE and an SRS spatial relation activation/deactivation MAC CE, are needed. The PUSCH spatial relation conforms to the SRS spatial relation.

In Rel. 16, at least one of the PUCCH spatial relation activation/deactivation MAC CE and the SRS spatial relation activation/deactivation MAC CE may not be used.

If both the spatial relation and the PL-RS for a PUCCH are not configured in FR2 (application condition, second condition), default assumptions for the spatial relation and the PL-RS (a default spatial relation and a default PL-RS) are applied to the PUCCH. If both the spatial relation and the PL-RS for an SRS (an SRS resource for the SRS, or an SRS resource corresponding to SRI in DCI format 0_1 scheduling the PUSCH) are not configured in FR2 (application condition, second condition), default assumptions for the spatial relation and the PL-RS (a default spatial relation and a default PL-RS) are applied to the PUSCH scheduled by DCI format 0_1 and the SRS.

If a CORESET is configured in the active DL BWP on the CC, the default spatial relation and the default PL-RS may be the TCI state or QCL assumption of the CORESET having the lowest CORESET ID in the active DL BWP. If a CORESET is not configured in the active DL BWP on the CC, the default spatial relation and the default PL-RS may be an active TCI state having the lowest ID of the PDSCH in the active DL BWP.

In Rel. 15, the spatial relation of a PUSCH scheduled by DCI format 0_0 conforms to a spatial relation of a PUCCH resource having the lowest PUCCH resource ID among the PUCCH active spatial relations on the same CC. The network is required to update the PUCCH spatial relations on all SCells even in a case that a PUCCH is not transmitted on the SCells.

In Rel. 16, a PUCCH configuration for the PUSCH scheduled by DCI format 0_0 is not required. In a case that there is no active PUCCH spatial relation or no PUCCH resource on the active UL BWP in the CC for the PUSCH scheduled by DCI format 0_0 (application condition, second condition), the default spatial relation and the default PL-RS are applied to the PUSCH.

The threshold described above may be referred to as a QCL time length (time duration), "timeDurationForQCL," "Threshold", "Threshold for offset between a DCI indicating a TCI state and a PDSCH scheduled by the DCI," "Threshold-Sched-Offset," a schedule offset threshold, a scheduling offset threshold, and the like.

(Multi-TRP)

In NR, a study is underway that one or a plurality of transmission/reception points (TRPs) (multi-TRP (MTRP)) use one or a plurality of panels (multi-panel) to perform DL transmission to the UE. A study is underway also that the UE uses one or a plurality of panels to perform UL transmission to one or the plurality of TRPs.

Note that the plurality of TRPs may correspond to the same cell identifier (cell ID), or different cell IDs. The cell ID may be a physical cell ID, or a virtual cell ID.

The multi-TRP (for example, TRP #1, TRP #2) may be connected by an ideal/non-ideal backhaul to communicate information, data, or the like. From the respective TRPs of the multi-TRP, different code words (CW) and different layers may be transmitted. A non-coherent joint transmission (NCJT) may be used as one form of multi-TRP transmission.

In the NCJT, for example, TRP #1 performs modulation mapping and layer mapping of a first codeword, and transmits, by using a first precoding, a first number of layers (for example, two layers) on a first PDSCH. Moreover, TRP #2 performs modulation mapping and layer mapping of a second codeword, and transmits, by using a second precoding, a second number of layers (for example, two layers) on a second PDSCH.

Note that a plurality of PDSCHs (multi-PDSCH) to be transmitted in the NCJT may be defined to partially or fully overlap in at least one of time and frequency domains. In other words, the first PDSCH from a first TRP and the second PDSCH from a second TRP may overlap each other in at least one of the time and frequency resources.

These first and second PDSCHs may be expected to be not in a quasi-co-location (QCL) relation (or to be not quasi-co-located) with each other. A reception of the multi-PDSCH may be interpreted as simultaneous reception of PDSCHs not in a given QCL type (for example, QCL type D).

A plurality of PDSCHs (also referred to as multi-PDSCH (multiple PDSCH)) from the multi-TRP may be scheduled by using one piece of DCI (single DCI, single PDCCH) (single master mode). A plurality of PDSCHs from the multi-TRP may be scheduled respectively by using a plurality of pieces of DCI (multi-DCI, multi-PDCCH (multiple PDCCH)) (multi-master mode).

According to such a multi-TRP scenario, a more flexible transmission control using a good quality channel is enabled.

To support multi-PDCCH based multi-TRP transmission with intra-cell (having the same cell ID) and inter-cell (having different cell IDs), one control resource set (CORE-SET) in PDCCH configuration information (PDCCH-Config) may correspond to one TRP in RRC configuration information for linking multiple PDCCH and PDSCH pairs with multi-TRP.

(PDCCH Reception Performance)

In frequency range (FR) 1, a block error rate (BLER) performance of PDCCH repetition using soft-combining and aggregation level (AL) 4 and a BLER performance of PDCCH repetition using soft-combining and AL8 are superior to a BLER performance of a single PDCCH using AL16 in all cases. In FR2, the BLER performance of PDCCH repetition using soft-combining and AL4, a BLER performance of PDCCH repetition using selection and AL4, the BLER performance of PDCCH repetition using soft-combining and AL8, and a BLER performance of PDCCH repetition using selection and AL8 are superior to the BLER performance of the single PDCCH using AL16. In an interference case, with respect to a given AL, a BLER performance gain achieved by the repetition using selection is near the BLER performance of the reception using soft-combining.

In Rel.15, as is in the example in FIG. 1, one PDCCH (PDCCH candidate) is associated with one search space set (search space). One search space set is associated with one CORESET with one TCI state/QCL assumption.

Then, the inventors of the present invention came up with a method for configuring/indicating/detecting a plurality of PDCCH candidates associated with different TCI states.

The PDCCH repetition across a plurality of CORESETs may be performed to perform soft-combining of the PDCCH candidates. In a case that each PDCCH candidate includes a CCE across a plurality of CORESETs, a search space set may be associated with a plurality of CORESETs.

Hereinafter, embodiments according to the present disclosure will be described in detail with reference to the drawings. Structures described in respective embodiments may each be employed individually, or may be employed in combination.

In the present disclosure, "A/B" and "at least one of A and B" may be interchangeably interpreted. In the present disclosure, a cell, a CC, a carrier, a BWP, a DL BWP, a UL BWP, an active DL BWP, an active UL BWP, and a band may be interchangeably interpreted. In the present disclosure, an index, ID, an indicator, and a resource ID may be interchangeably interpreted. In the present disclosure, RRC, an RRC parameter, an RRC message, a higher layer parameter, an information element (IE), and a configuration may be interchangeably interpreted. In the present disclosure, "support," "control," "can control," "operate," and "can operate" may be interchangeably interpreted.

In the present disclosure, activate, update, indicate, enable, and specify may be interchangeably interpreted.

In the present disclosure, a MAC CE, an update command, and an activation/deactivation command may be interchangeably interpreted.

In the present disclosure, for example, the higher layer signaling may be any one or combinations of Radio Resource Control (RRC) signaling, Medium Access Control (MAC) signaling, broadcast information, and the like.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

In the present disclosure, a beam, a spatial domain filter, a TCI state, a QCL assumption, a QCL parameter, a spatial domain reception filter, a UE spatial domain reception filter, a UE receive beam, a DL beam, a DL receive beam, a DL precoding, a DL precoder, a DL-RS, a QCL type D in a TCI state, a QCL type D RS in a TCI state, a QCL type D RS in a TCI state or QCL assumption, a QCL type A RS in a TCI state or QCL assumption, a spatial relation, a spatial domain transmission filter, a UE spatial domain transmission filter, a UE transmit beam, a UL beam, a UL transmit beam, a UL precoding, and a UL precoder may be interchangeably interpreted. In the present disclosure, a QCL type X-RS, a DL-RS associated with a QCL type X, a DL-RS having a QCL type X, a source of a DL-RS, a SSB, and a CSI-RS may be interchangeably interpreted.

In the present disclosure, a panel, an Uplink (UL) transmission entity, a TRP, a spatial relation, a control resource set (CORESET), a PDSCH, a codeword, a base station, an antenna port of a signal (for example, demodulation reference signal (DMRS) port), an antenna port group of a signal (for example, DMRS port group), a group for multiplexing (for example, code division multiplexing (CDM) group, reference signal group, CORESET group), a CORESET pool, a CW, a redundancy version (RV), and a layer (MIMO layer, transmission layer, spatial layer) may be interchangeably interpreted. A panel Identifier (ID) and a panel may be interchangeably interpreted. In the present disclosure, a TRP ID and a TRP may be interchangeably interpreted.

In the present disclosure, the UE configured with a plurality of TRPs may determine at least one of a TRP corresponding to the DCI, a TRP corresponding to a PDSCH or UL transmission (PUCCH, PUSCH, SRS, or the like) scheduled by the DCI, and the like, based on at least one of the following items.

A value of a given field included in the DCI (for example, a field specifying the TRP, an antenna port field, PRI).

A DMRS corresponding to a scheduled PDSCH/PUSCH (for example, a sequence, resource, CDM group, DMRS port, DMRS port group, and antenna port group for the DMRS, or the like).

A DMRS corresponding to a PDCCH on which the DCI is transmitted (for example, a sequence, resource, CDM group, DMRS port, and DMRS port group for the DMRS, or the like).

A CORESET receiving the DCI (for example, a CORESET pool ID of the CORESET, an ID of the CORESET, a scramble ID (that may be interpreted as a sequence ID), a resource, or the like).

An RS used for a TCI state, a QCL assumption, spatial relation information, or the like (an RS related group, or the like).

In the present disclosure, the single PDCCH (DCI) may be referred to as the PDCCH (DCI) of a first scheduling type (for example, a scheduling type A (or type 1)). The multi-PDCCH (DCI) may be referred to as the PDCCH (DCI) of a second scheduling type (for example, a scheduling type B (or type 2)).

In the present disclosure, the single PDCCH may be expected to be supported in a case that an ideal backhaul is used by the multi-TRP. The multi-PDCCH may be expected to be supported in a case that a non-ideal backhaul is used between the multi-TRP.

Note that the ideal backhaul may be referred to as DMRS port group type 1, reference signal related group type 1, antenna port group type 1, CORESET pool type 1, or the like. The non-ideal backhaul may be referred to as DMRS port group type 2, reference signal related group type 2, antenna port group type 2, CORESET pool type 2, or the like. The names are not limited to those above.

In the present disclosure, multi-TRP, multi-TRP system, multi-TRP transmission, and multi-PDSCH may be interchangeably interpreted. In the present disclosure, a single DCI, a single PDCCH, a single DCI based multi-TRP system, and two TCI states on at least one TCI code point being activated may be interchangeably interpreted. In the present disclosure, multi-DCI, multi-PDCCH, multi-DCI based multi-TRP system, and two CORESET pool indices or CORESET pool index=1 being configured may be interchangeably interpreted.

In the present disclosure, a search space set (SSS) and a search space (SS) may be interchangeably interpreted.

(Radio Communication Method)

First Embodiment

Two sets of resource element group (REG)/control channel element (CCE)/monitoring occasion in one CORESET may include TCI states different from each other. One PDCCH candidate may include the REG/CCE from both two sets.

The UE may follow at least one of operations 1-1 and 1-2 below.

<<Operation 1-1>>

A plurality of resources corresponding to one search space set (or associated with a search space set) may respectively include a plurality of different TCI states (or may be configured/indicated with a plurality of different TCI states). In the present disclosure, a resource may be interpreted as an REG/CCE/monitoring occasion (PDCCH monitoring occasion).

A plurality of resources respectively corresponding to a plurality of different TCI states may be multiplexed by at least one of frequency division multiplexing (FDM), space division multiplexing (SDM), and time division multiplexing (TDM). A resource corresponding to the n-th TCI state may be referred to as the n-th resource.

Figures 2A, 2B:
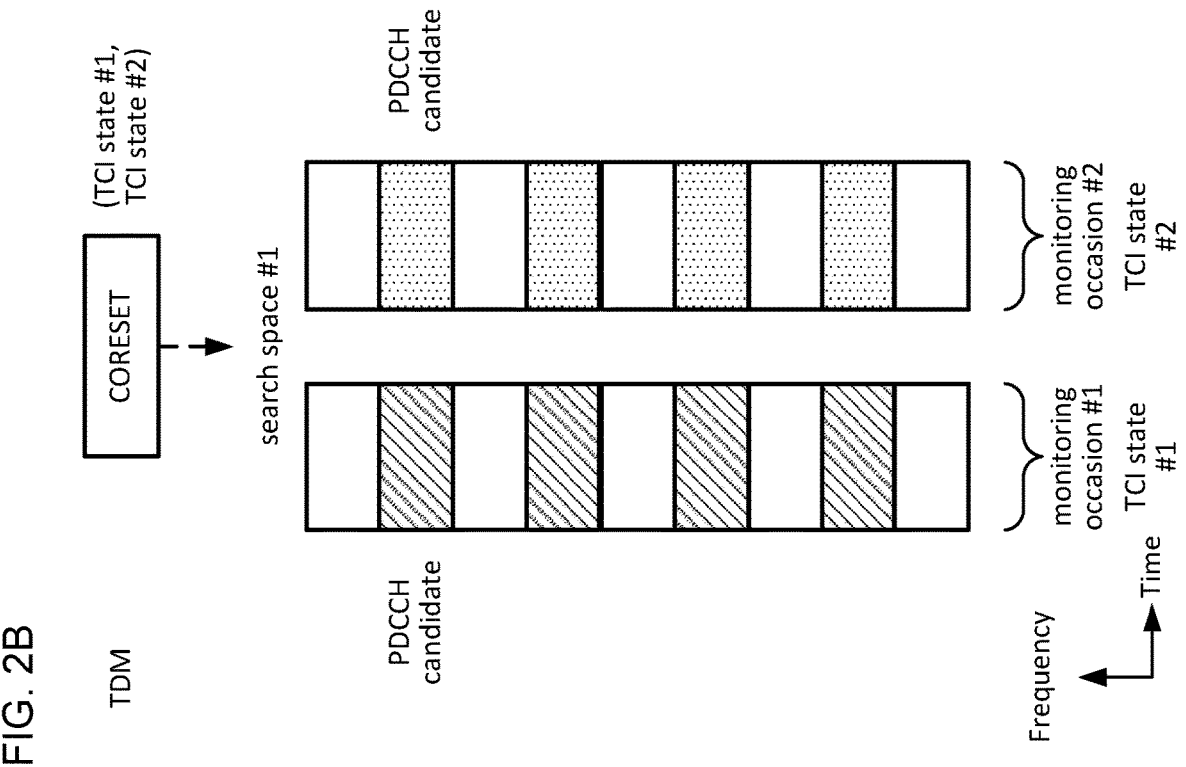
FIGS. 2A and 2B are diagrams to show an example of FDM and TDM of a plurality of PDCCH candidates associated with one CORESET and one search space set.

In an example in FIG. 2A, two sets of REG/CCE respectively correspond to two different TCI states #1, #2. A plurality of PDCCH candidates based on two sets may be FDMed.

In an example in FIG. 2B, two monitoring occasions #1, #2 correspond to two different TCI states #1, #2, respectively. The PDCCH candidates being respectively associated with the monitoring occasions #1, #2 may cause a plurality of PDCCH candidates corresponding to two different TCI states #1, #2 to be TDMed.

Figure 3:
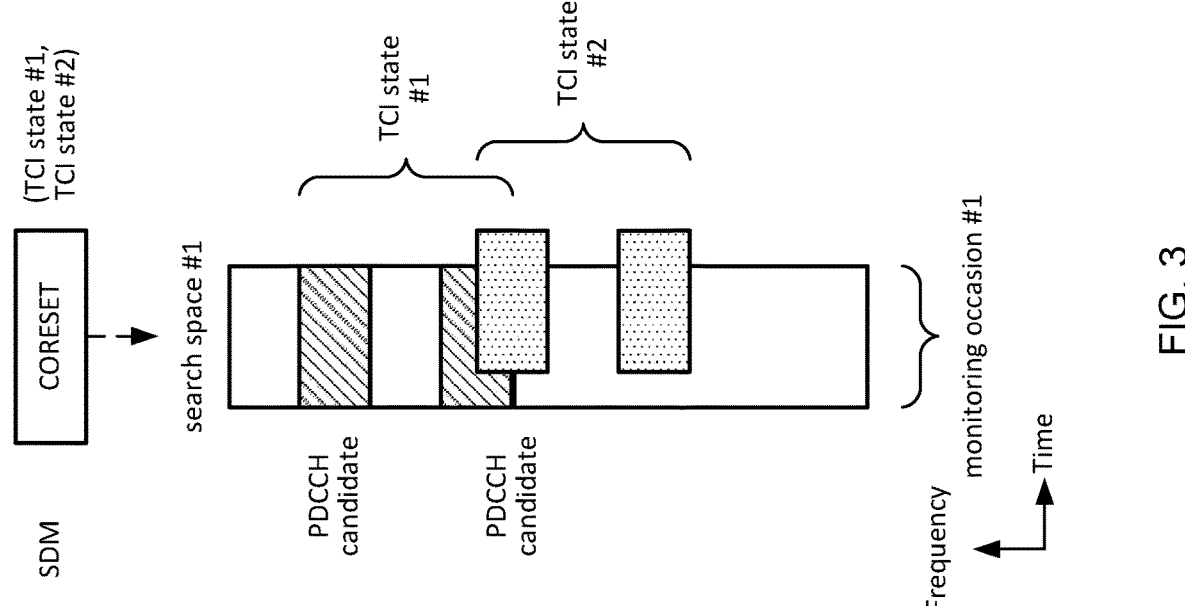
FIG. 3 is a diagram to show an example of SDM of a plurality of PDCCH candidates associated with one CORESET and one search space set.

In an example in FIG. 3, two sets of REG/CCE respectively correspond to two different TCI states #1, #2. A plurality of PDCCH candidates based on two sets may be SDMed.

A plurality of TCI states for one CORESET may be notified by the RRC/MAC CE. A plurality of TCI states may be assigned to a plurality of resources based on a rule. For example, the rule may be at least one of assigning a plurality of TCI states in ascending order of the resource ID, assigning a plurality of TCI states in descending order of the resource ID, and assigning two TCI states to respectively the odd number and even number of the resource ID. In the present disclosure, the resource ID may be at least one of a search space ID, an REG index, and a CCE index.

One TCI state per CORESET may be notified by the RRC/MAC CE. An additional TCI state for the CORESET or the search space set may be notified by the RRC/MAC CE.

In a case that an additional TCI state is notified for the CORESET, the CORESET may be associated with two TCI states. For the CORESET, the TCI state notified by the mechanism in Rel. 15/16 may be a first TCI state, and the additional TCI state may be a second TCI state.

In a case that an additional TCI state is notified for the search space set, the search space set may be associated with two TCI states. For the search space set, the TCI state notified by the mechanism in Rel. 15/16 may be the first TCI state, the additional TCI state may be the second TCI state.

The search space set not notified of the additional TCI state may be associated with only the TCI state notified by the mechanism in Rel. 15/16, and the UE may detect a PDCCH by the mechanism in Rel. 15/16. In this case, the UE may not try to perform blind detection of PDCCH by using different QCL type D.

A plurality of TCI states being associated with one CORESET, and one or a plurality of or all of search space sets being associated with the CORESET may cause the one or plurality of or all of search space sets to be associated with the plurality of TCI states.

The plurality of TCI states may be two TCI states, or three or more TCI states.

For the search space set including a plurality of TCI states, the UE may follow any of procedures 1 and 2 below.

[Procedure 1]

The UE may use the indicated first TCI state to detect, by blind detection, some of the resources of the PDCCH candidates determined in accordance with Rel. 15/16, or may use the indicated second TCI state to detect, by blind detection, other resources of the resources of the PDCCH candidates determined in accordance with Rel. 15/16. According to the procedure 1, a resource size of the PDCCH candidates is not different from that in Rel. 15/16.

The resources of a plurality of PDCCH candidates (time/frequency) in an example in FIG. 4A are determined in accordance with Rel. 15/16. In an example in FIG. 4B, a first part of the resources in FIG. 4A is associated with TCI state #1 and a second part is associated with TCI state #2. The UE may use TCI state #1 to detect, by blind detection, the first part and use TCI state #2 to detect, by blind detection, the second part.

[Procedure 2]

The UE may use the indicated first TCI state to detect, by blind detection, all of the resources of the PDCCH candidates determined in accordance with Rel. 15/16, or may use the indicated second TCI state to detect, by blind detection, other resources derived by the rule (for example, by giving an offset and copying). According to the procedure 2, such a problem as in FIG. 7 described later does not occur.

Figure 5:
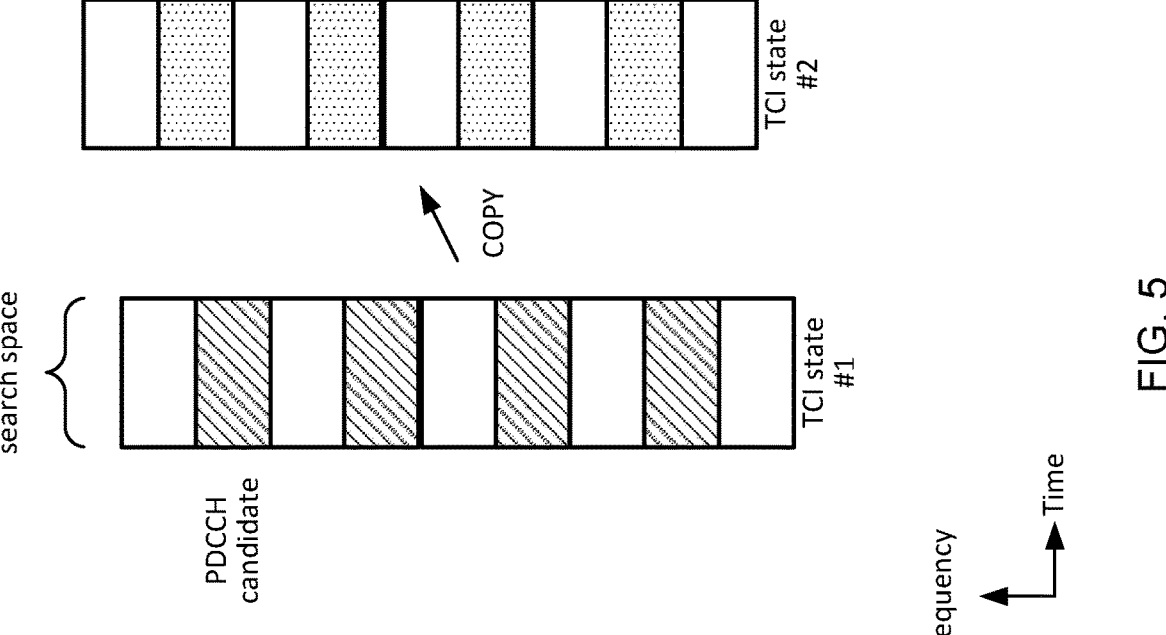
FIG. 5 is a diagram to show another example of PDCCH candidates using PDCCH candidate resources in accordance with Rel. 15/16.

In an example in FIG. 5, a first resource in FIG. 4A is associated with TCI state #1, and a second resource obtained from the first resource by the rule is associated with TCI state #2. The UE may use TCI state #1 to detect, by blind detection, the first resource and use TCI state #2 to detect, by blind detection, the second resource.

A plurality of monitoring occasions may correspond to (or may be configured for, or associated with) one search space set, the UE may determine (select) a monitoring occasion, based on the TCI state corresponding to the search space set.

The REGs/CCEs corresponding to the respective monitoring occasions may be the same or different from each other. In a case that the REGs/CCEs are different from each other depending on the monitoring occasion, the REGs/CCEs may be determined using a conversion equation including an index of a symbol/slot/subslot/frame/subframe. The REGs/CCEs may be determined based on the notified information.

In an example in FIG. 6A, monitoring occasions #1 to #64 the number of which is equal to the number of TCI states (for example, the number of SSBs) used in the cell may be configured, and monitoring occasions #1, #4 to be actually monitored may be determined (switched) depending on the notified TCI states. This method is preferable for a common search space (CSS) and broadcast.

In an example in FIG. 6B, the monitoring occasions the number of which is equal to the number of TCI states configured for CORESET/search space set #1 may be configured, and monitoring occasions #1, #2 may be determined (switched) depending on TCI states #1, #4 used for the blind detection.

In a case that in a search space set, an issue is that when the TCI states are different from each other in a plurality of PDCCH candidates within the same symbol and the AL is greater than a given value, which TCI state is used to perform blind detection of PDCCH.

Figure 7:
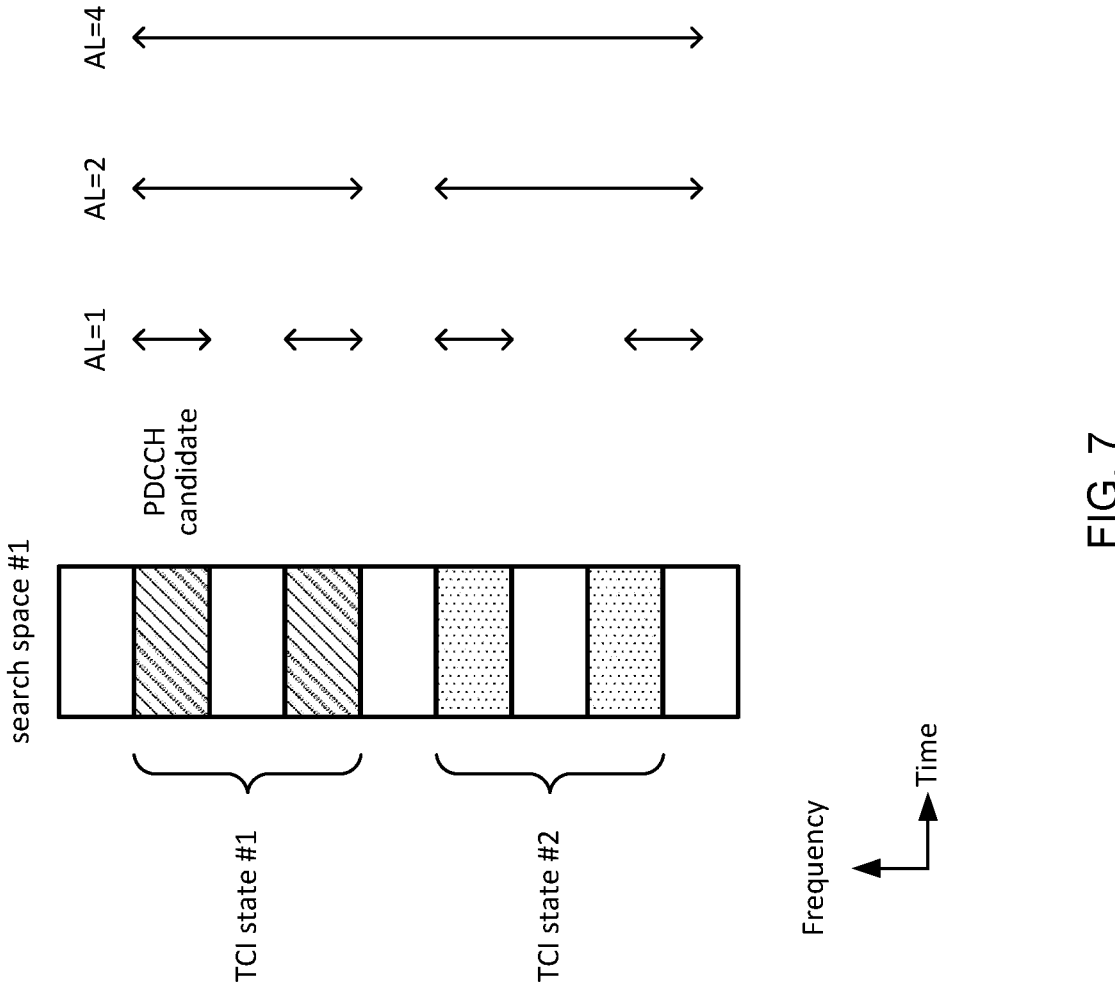
FIG. 7 is a diagram to show an example of an issue in an operation 1-1.

In an example in FIG. 7, an issue is that in a case that the AL for the PDCCH candidates is 4, and TCI states #1, #2 are associated therein, which of TCI states #1 and #2 is used for blind detection.

In a case that in a search space set, the TCI states are different from each other in a plurality of PDCCH candidates within the same symbol, the AL is greater than a given value, and the TCI states for a plurality of REGs/CCEs in the AL are different from each other, the UE may follow at least one of TCI state determination methods 1-1 to 1-6 below to perform blind detection of PDCCH.

[TCI State Determination Method 1-1]

The UE may use the TCI state corresponding to the smallest or largest index of the plurality of REGs/CCEs in the AL for blind detection of PDCCH. In other words, the UE may use, in the plurality of REGs/CCEs in the AL, the TCI state corresponding to the smallest or largest index of the indices of the respective REGs/CCEs when the AL is 1 for blind detection of PDCCH.

[TCI State Determination Method 1-2]

The UE may use the TCI state having the smallest or largest TCI state ID of the TCI states corresponding to the plurality of REGs/CCEs in the AL for blind detection of PDCCH. In other words, the UE may use, in the plurality of REGs/CCEs in the AL, the TCI state having the smallest or largest TCI state ID of the indices of the respective REGs/CCEs when the AL is 1 for blind detection of PDCCH.

[TCI State Determination Method 1-3]

The UE may use the TCI state having the smallest or largest TCI state ID of the all configured/active TCI states in the DL-BWP/CC for blind detection of PDCCH.

[TCI State Determination Method 1-4]

The UE may use the default TCI state for at least one of single TRP, single DCI for multi-TRP, and multi-DCI for multi-TRP for blind detection of PDCCH.

[TCI State Determination Method 1-5]

The UE may use both two TCI states in the AL for blind detection of PDCCH. The UE reporting that simultaneous reception of PDCCH/PDSCH/CSI-RS using two TCI states is possible (is supported) through UE capability may use the TCI state determination method.

[TCI State Determination Method 1-6]

The UE may not expect that in a search space set, the TCI states are different from each other in a plurality of PDCCH candidates within the same symbol, the AL is greater than a given value, and the TCI states for a plurality of REGs/CCEs in the AL are different from each other.

<<Operation 1-2>>

One or a plurality of search space sets associated with different TCI states may be associated with (may correspond to) one CORESET.

The search space sets associated with a plurality of different TCI states may be multiplexed by at least one of FDM/SDM/TDM. A search space set corresponding to the n-th TCI state may be referred to as the n-th search space set.

Figure 8:
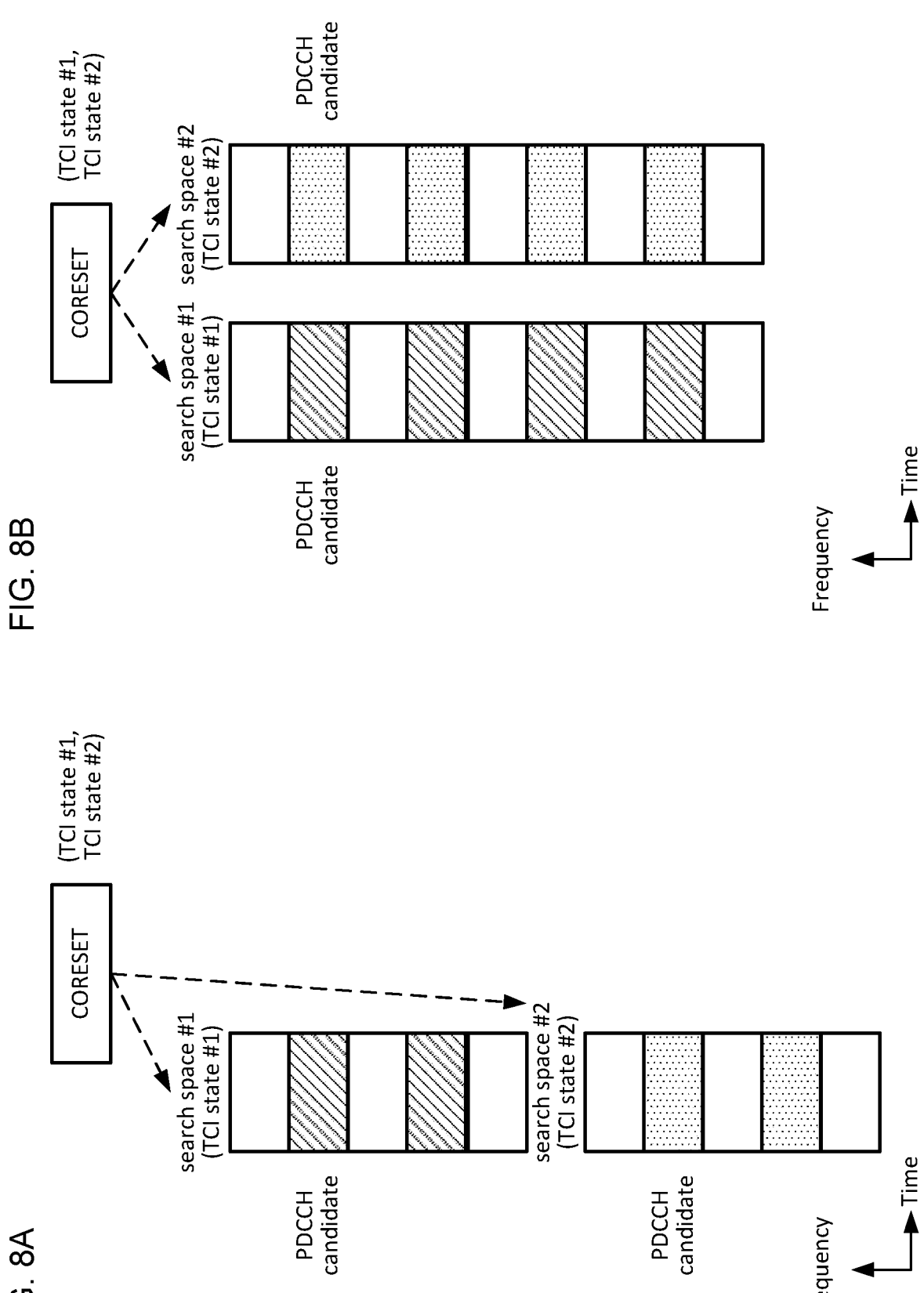
FIGS. 8A and 8B are diagrams to show an example of FDM/TDM of a plurality of PDCCH candidates respectively associated with a plurality of search space sets associated with one CORESET.
Figure 9:
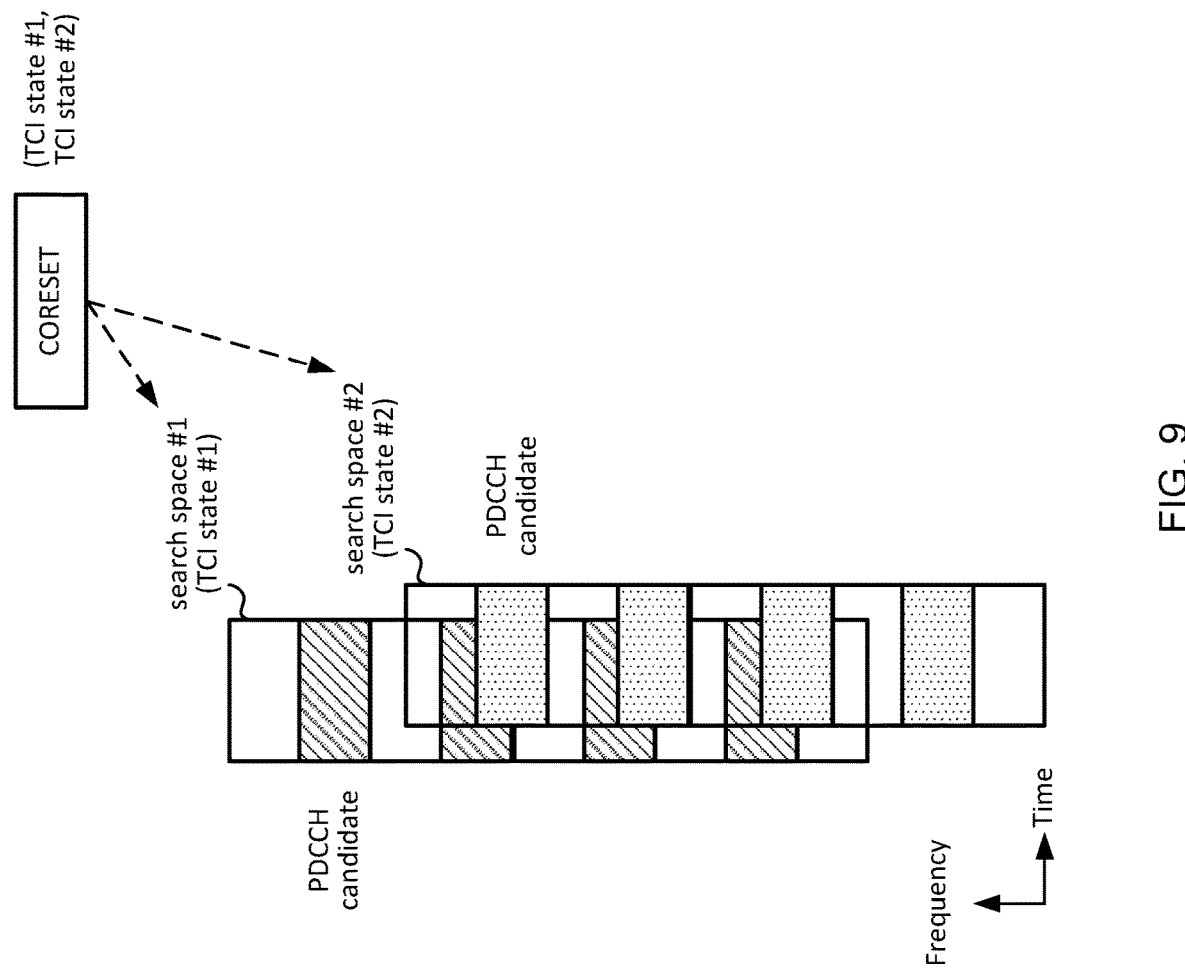
FIG. 9 is a diagram to show an example of SDM of a plurality of PDCCH candidates respectively associated with a plurality of search space sets associated with one CORESET.

In examples in FIG. 8A, FIG. 8B, and FIG. 9, one CORESET is associated with search spaces #1, #2. Search space #1 is associated with TCI state #1, and search space #2 is associated with TCI state #2. In the example in FIG. 8A, a PDCCH candidate for search space #1 and a PDCCH candidate for search space #2 are FDMed. In the example in FIG. 8B, a PDCCH candidate for search space #1 and a PDCCH candidate for search space #2 are TDMed. In the example in FIG. 9, a PDCCH candidate for search space #1 and a PDCCH candidate for search space #2 are DDMed.

The TCI state per search space set may be notified by the RRC/MAC CE. The TCI state for the search space set not configured with/not notified of the TCI state may be the TCI state configured/notified for the corresponding CORESET.

One TCI state per CORESET may be notified by the RRC/MAC CE. An additional TCI state for the CORESET or the search space set may be notified by the RRC/MAC CE.

In a case that an additional TCI state is notified for the CORESET, the CORESET may be associated with two TCI states. For the CORESET, the TCI state notified by the mechanism in Rel. 15/16 may be a first TCI state, and the additional TCI state may be a second TCI state.

In a case that an additional TCI state is notified for the search space set, the search space set may be associated with two TCI states. For the search space set, the TCI state notified by the mechanism in Rel. 15/16 may be the first TCI state, the additional TCI state may be the second TCI state.

The search space set not notified of the additional TCI state may be associated with only the TCI state notified by the mechanism in Rel. 15/16, and the UE may detect a PDCCH by the mechanism in Rel. 15/16. In this case, the UE may not try to perform blind detection of PDCCH by using different QCL type D.

The TCI state may not be notified per CORESET. Even if the TCI state is notified per CORESET, the TCI state notified per CORESET may not be applied to at least some of the search space sets.

The TCI state notified per search space set may be applied to, or the TCI state notified per CORESET may not be applied to the search space set configured with/notified of the TCI state.

The TCI state per search space set may follow at least one of notification methods 1 and 2 below.

[Notification Method 1]

The higher layer signaling (information element) indicating each search space set may include a TCI state field. The TCI states different for each search space set may be configured/notified by the higher layer signaling.

Figures 10A, 10B:
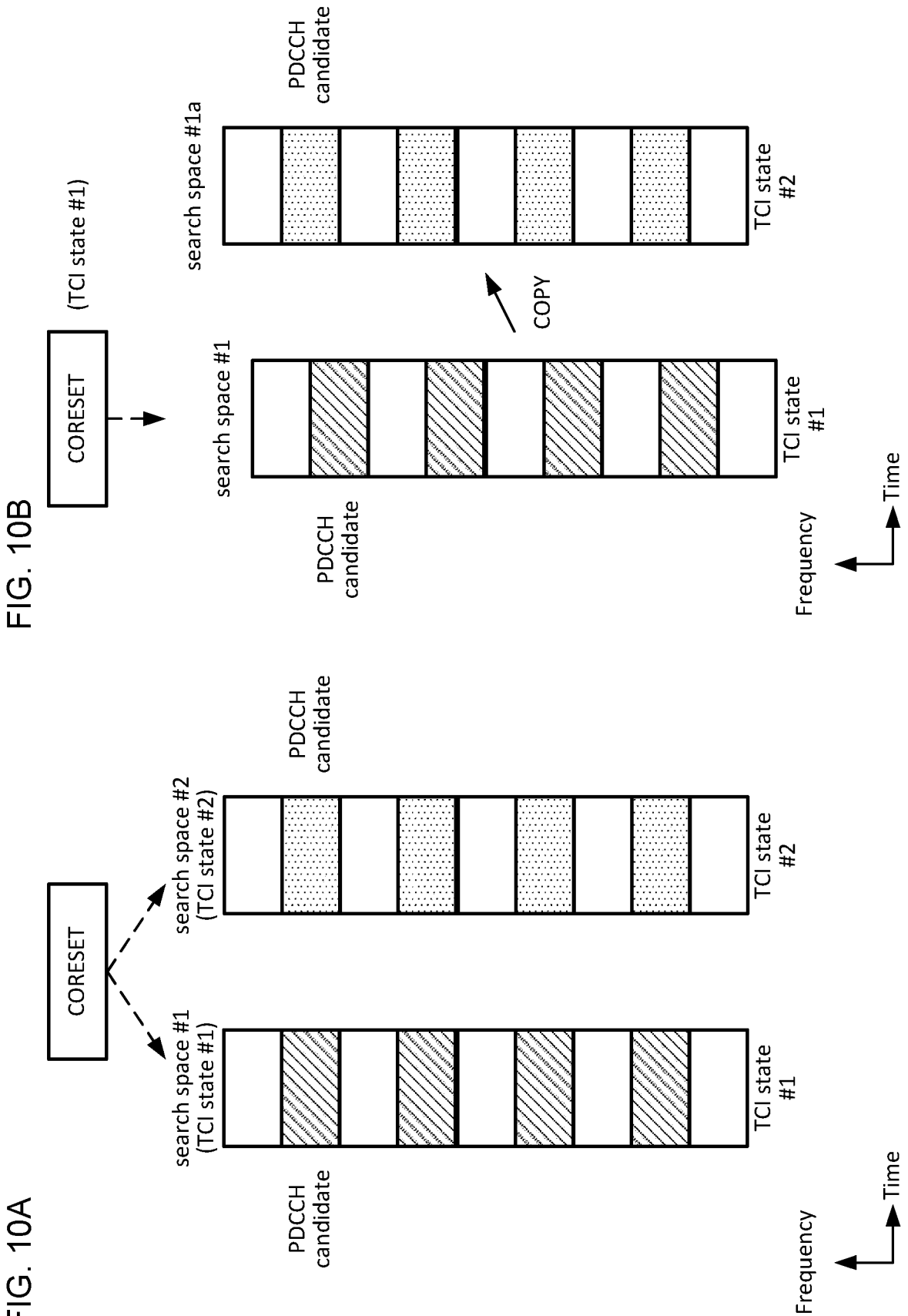
FIGS. 10A and 10B are diagrams to show an example of a notification method of a TCI state.

In an example in FIG. 10A, one CORESET is associated with search spaces #1, #2. Search space #1 is associated with TCI state #1, and search space #2 is associated with TCI state #2. Search spaces #1 and 2 may be FDMed/TDMed/SDMed. The UE detects, by blind detection, a PDCCH candidate for search space #1 by use of TCI state #1, and detects, by blind detection, a PDCCH candidate for search space #2 by use of TCI state #2.

[Notification Method 2]

The TCI state for the first search space set may be the first TCI state configured/notified for the CORESET. The TCI state for the second search space set obtained from the first search space set (by copying to another time/frequency) based on a rule may be the second TCI state configured/notified by the higher layer signaling.

In an example in FIG. 10B, one CORESET is associated with search space #1. Search space #1 is associated with TCI state #1. A resource of a PDCCH candidate for search space #1a is obtained from the resource of the PDCCH candidate for search space #1 based on the rule. Search space #1a is associated with TCI state #2. The UE detects, by blind detection, the PDCCH candidate for search space #1 by use of TCI state #1, and detects, by blind detection, the PDCCH candidate for search space #1a by use of TCI state #2.

In a case that the REGs/CCEs/monitoring occasions overlap in the PDCCH candidates for different search spaces, an issue is how the UE operates.

Figure 11:
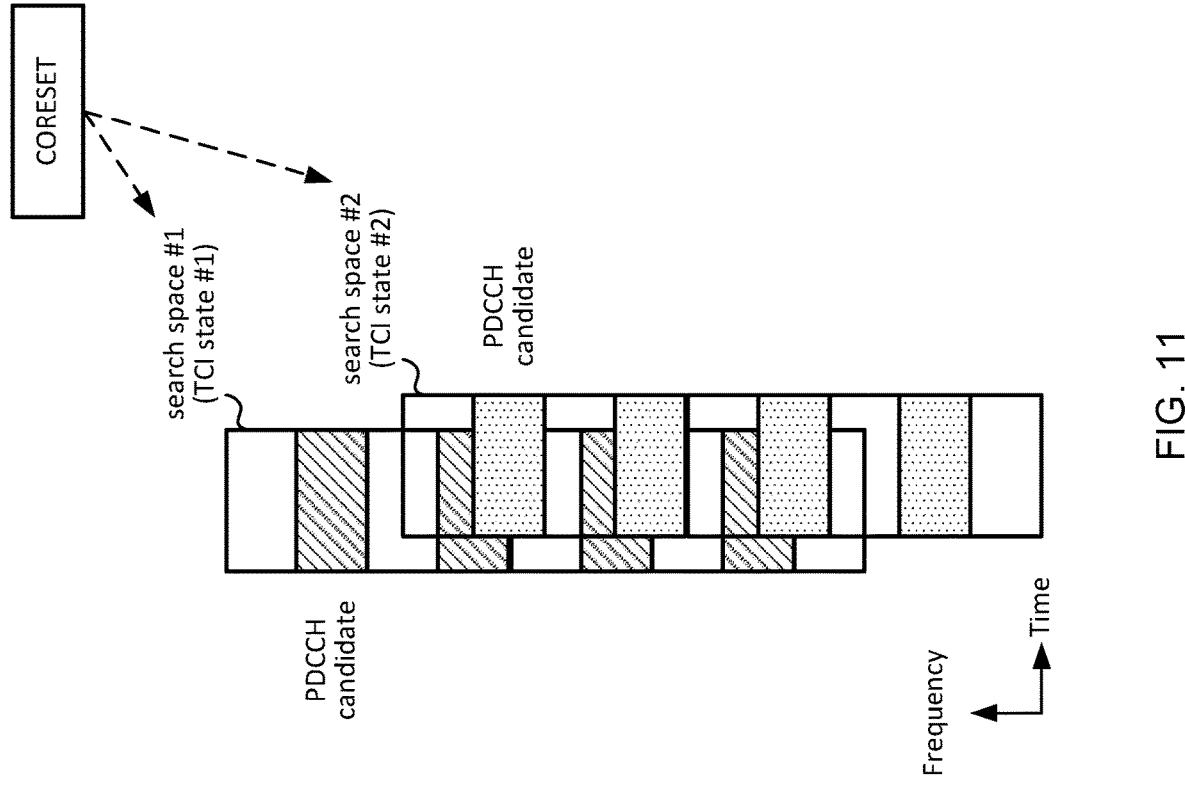
FIG. 11 is a diagram to show an example of an issue in an operation 1-2.

In an example in FIG. 11, one CORESET is associated with search spaces #1, #2. Search space #1 is associated with TCI state #1, and search space #2 is associated with TCI state #2. The resource of the PDCCH candidate for search space #1 and the resource of the PDCCH candidate for search space #2 overlap.

In a case that the PDCCH candidates for a plurality of search space sets associated with different TCI states are configured in the same symbol, or in a case that the resources of the PDCCH candidates for the search space sets associated with different TCI states overlap, the UE may follow at least one of TCI state determination methods 2-1 to 2-6 below to perform blind detection of PDCCH.

[TCI State Determination Method 2-1]

The UE may use the TCI state corresponding to the smallest or largest search space set ID of the search space sets corresponding to the overlapping resources for blind detection of PDCCH.

[TCI State Determination Method 2-2]

The UE may use the TCI state having the smallest or largest TCI state ID of the search space sets corresponding to the overlapping resources for blind detection of PDCCH.

[TCI State Determination Method 2-3]

The UE may use the TCI state having the smallest or largest TCI state ID of the all configured/active TCI states in the DL-BWP/CC for blind detection of PDCCH.

[TCI State Determination Method 2-4]

The UE may use the default TCI state for at least one of single TRP, single DCI for multi-TRP, and multi-DCI for multi-TRP for blind detection of PDCCH.

[TCI State Determination Method 2-5]

The UE may use both two TCI states respectively associated with two search space sets for blind detection of PDCCH. The UE reporting that simultaneous reception of PDCCH/PDSCH/CSI-RS using two TCI states is possible (is supported) through UE capability may use the TCI state determination method.

[TCI State Determination Method 2-6]

The UE may not expect that the PDCCH candidates for a plurality of search space sets associated with different TCI states are configured in the same symbol, or the resources of the PDCCH candidates for the search space sets associated with different TCI states overlap. In other words, the resources of the PDCCH candidates for search space sets associated with different TCI states may not overlap.

According to the first embodiment described above, the TCI state for the PDCCH can be appropriately determined.

Second Embodiment

A new MAC CE may notify a plurality of TCI stated per CORESET, or one or a plurality of TCI states per search space set.

The new MAC CE may follow at least one of MAC CEs 1 to 3 below.

<<MAC CE 1>>

The new MAC CE may notify a plurality of TCI states per CORESET. The new MAC CE may be referred to as an enhanced TCI states activation/deactivation for UE-specific PDCCH MAC CE.

Figure 12:
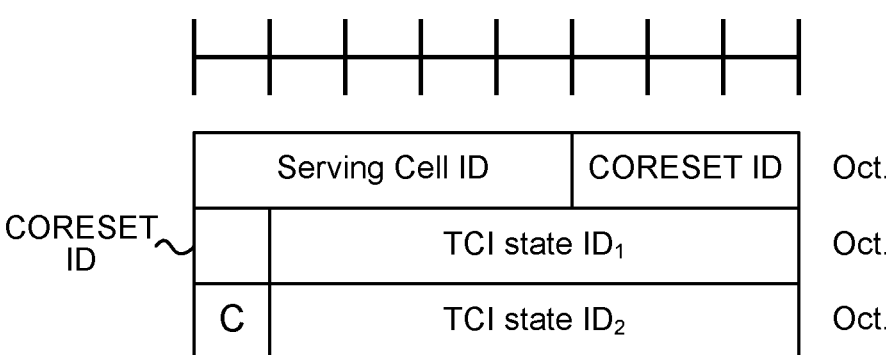
FIG. 12 is a diagram to show an example of a MAC CE 1.

In an example in FIG. 12, the new MAC CE may include at least one of a serving cell ID field, a CORESET ID field, a TCI state ID 1 field, a C field, and a TCI state ID 2 field. The C field may indicate whether or not the TCI state ID 2 field (an octet including the TCI state ID 2 field) exists. For example, in a case that the C field is set to 1, the TCI state ID 2 field (an octet including the TCI state ID 2 field) may exist, and in a case that the C field is set to 0, the TCI state ID 2 field (an octet including the TCI state ID 2 field) may not exist. A TCI state ID j field may indicate the j-th TCI state, and may indicate a TCI state identified by a TCI state ID applicable to a CORESET identified by the CORESET ID field. In a case that the CORESET ID field is set to 0, the TCI state ID field may indicate a TCI state for one TCI state among the first 64 TCI states configured by a TCI state addition/modification list (tci-State-ToAddModList) and a TCI state release list (tci-States-ToReleaseList) in a PDSCH configuration (PDSCH-Config) in an active BWP. In a case that the CORESET ID field is set to a value other than 0, the TCI state ID field may indicate a TCI state ID configured by a TCI state for PDCCH addition list (tci-StatesPDCCH-ToAddList) and a TCI state for PDCCH release list (tci-StatesPDCCH-ToReleaseList) in a CORESET configuration identified by the indicated CORESET.

In FIG. 12, the C field may be included not in an octet 3 but in an octet 2. In this case, a size of at least one of the serving cell ID field, the CORESET ID field, and the TCI state ID j field may be limited.

In this case, up to two TCI states are indicated, but the number of TCI states indicated by the new MAC CE is not limited to two. The number of TCI states indicated by the new MAC CE and the number of octets of the new MAC CE may be variable depending on the number configured by the higher layer or the number reported through the UE capability.

The UE receiving the new MAC CE may not receive a TCI states indication for UE-specific PDCCH MAC CE. In a case that the UE receives the new MAC CE and the TCI states indication for UE-specific PDCCH MAC CE, the UE may apply only the last received MAC CE, or may apply the new MAC CE on a priority basis.

<<MAC CE 2>>

The new MAC CE may notify one TCI state per search space set. The new MAC CE may be referred to as an enhanced TCI states activation/deactivation for UE-specific PDCCH MAC CE.

Figure 13:
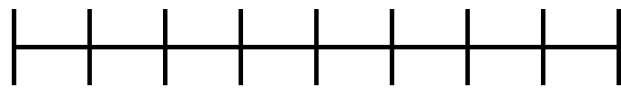
FIG. 13 is a diagram to show an example of a MAC CE 2.

In an example in FIG. 13, the new MAC CE may include at least one of a serving cell ID field, a search space ID field, a reserved (R) field, and a TCI state ID field. The search space ID field may indicate a search space identified by a search space ID information element. The TCI state ID field may indicate a TCI state applicable to the search space identified by the search space ID field. In a case that the search space ID field (or the CORESET ID associated with the search space ID) is set to 0, the TCI state ID field may indicate a TCI state for one TCI state among the first 64 TCI states configured by the TCI state addition/modification list and the TCI state release list in the PDSCH configuration in an active BWP. In a case that the search space ID field (or the CORESET ID associated with the search space ID) is set to a value other than 0, the TCI state ID field may indicate a TCI state ID configured by the TCI state for PDCCH addition list and the TCI state for PDCCH release list in a CORESET configuration identified by the corresponding CORESET.

The search space ID can be configured with up to 40 values per cell, and is an ID unique to all BWPs. Accordingly, the search space ID field may include six bits.

In a search space configuration, the TCI state addition/modification list and the TCI state release list may be configured. The TCI state ID field may indicate a TCI state ID configured by the TCI state addition/modification list and the TCI state release list in the search space configuration identified by the search space ID field.

[Variation 1]

The new MAC CE may notify a plurality of TCI states per search space set.

In an example in FIG. 14, the new MAC CE may include at least one of a serving cell ID field, a search space ID field, a reserved (R) field, a TCI state ID 1 field, a C field, and a TCI state ID 2 field. The C field may indicate whether or not the TCI state ID 2 field (an octet including the TCI state ID 2 field) exists. For example, in a case that the C field is set to 1, the TCI state ID 2 field (an octet including the TCI state ID 2 field) may exist, and in a case that the C field is set to 0, the TCI state ID 2 field (an octet including the TCI state ID 2 field) may not exist.

The search space ID field may indicate a search space identified by a search space ID information element. A TCI state ID j field may indicate the j-th TCI state, and may indicate a TCI state identified by a TCI state ID applicable to the search space identified by the search space ID field. In a case that the search space ID field (or the CORESET ID associated with the search space ID) is set to 0, the TCI state ID field may indicate a TCI state for one TCI state among the first 64 TCI states configured by the TCI state addition/modification list and the TCI state release list in the PDSCH configuration in an active BWP. In a case that the search space ID field (or the CORESET ID associated with the search space ID) is set to a value other than 0, the TCI state ID field may indicate a TCI state ID configured by the TCI state for PDCCH addition list and the TCI state for PDCCH release list in a CORESET configuration identified by the corresponding CORESET.

In FIG. 14, the R field in an octet 3 may be replaced with the C field, and the C field in an octet 4 may be replaced with the R field.

[Variation 2]

In the MAC CE 2, the number of bits of the search space ID field may be limited. This can reduce overhead for the MAC CE.

Figure 15:
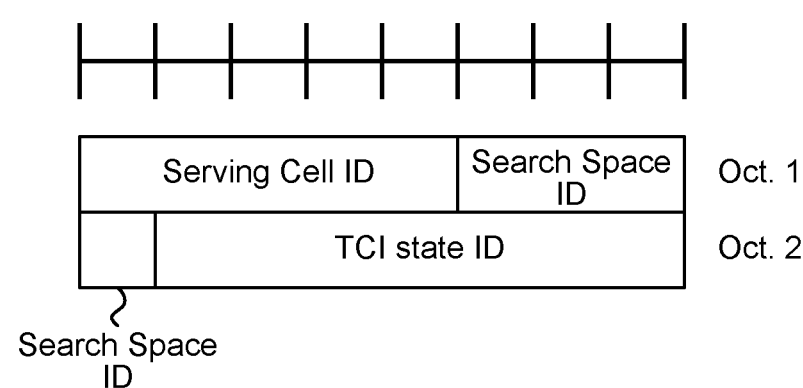
FIG. 15 is a diagram to show an example of Variation 2 of the MAC CE 2.

In an example in FIG. 15, the new MAC CE may include at least one of a serving cell ID field, a search space ID field, and a TCI state ID field. The search space ID field may indicate a search space identified by a search space ID information element. The TCI state ID field may indicate a TCI state applicable to the search space identified by the search space ID field. In a case that the search space ID field (or the CORESET ID associated with the search space ID) is set to 0, the TCI state ID field may indicate a TCI state for one TCI state among the first 64 TCI states configured by the TCI state addition/modification list and the TCI state release list in the PDSCH configuration in an active BWP. In a case that the search space ID field (or the CORESET ID associated with the search space ID) is set to a value other than 0, the TCI state ID field may indicate a TCI state ID configured by the TCI state for PDCCH addition list and the TCI state for PDCCH release list in a CORESET configuration identified by the corresponding CORESET.

Limiting the number of kinds of the search space ID indicated by the search space ID field to 16 can suppress overhead for the same search space ID field in Rel. 15.

A list of up to 16 search space IDs capable of indicating the TCI state per search space set may configured by the RRC.

An index corresponding to ascending or descending order of a value of the search space ID in the configured list may be indicated by the search space ID field in the new MAC CE.

The list of the search space ID may not be configured by the RRC. The search space configuration may include the TCI state ID. An index corresponding to ascending or descending order of a value of the search space ID of the search space configured with the TCI state may be indicated by the search space ID field in the new MAC CE.

<<MAC CE 3>>

The new MAC CE may notify the CORESET of an additional TCI state. The new MAC CE may be referred to as an additional TCI states activation/deactivation for UE-specific PDCCH MAC CE.

Figure 16:
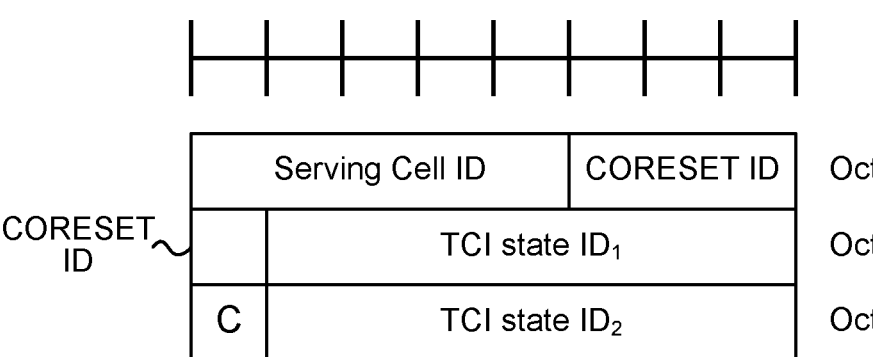
FIG. 16 is a diagram to show an example of a MAC CE 3.

In an example in FIG. 16, the new MAC CE may include at least one of a serving cell ID field, a CORESET ID field, a TCI state ID 1 field, a C field, and a TCI state ID 2 field. The C field may indicate whether or not the TCI state ID 2 field (an octet including the TCI state ID 2 field) exists. For example, in a case that the C field is set to 1, the TCI state ID 2 field (an octet including the TCI state ID 2 field) may exist, and in a case that the C field is set to 0, the TCI state ID 2 field (an octet including the TCI state ID 2 field) may not exist. A TCI state ID j field may indicate the j-th TCI state, and may indicate a TCI state identified by a TCI state ID applicable to a CORESET identified by the CORESET ID field. In a case that the CORESET ID field is set to 0, the TCI state ID field may indicate a TCI state for one TCI state among the first 64 TCI states configured by a TCI state addition/modification list (tci-State-ToAddModList) and a TCI state release list (tci-States-ToReleaseList) in a PDSCH configuration (PDSCH-Config) in an active BWP. In a case that the CORESET ID field is set to a value other than 0, the TCI state ID field may indicate a TCI state ID configured by a TCI state for PDCCH addition list (tci-StatesPDCCH-ToAddList) and a TCI state for PDCCH release list (tci-StatesPDCCH-ToReleaseList) in a CORESET configuration identified by the indicated CORESET.

In FIG. 16, the C field may be included not in an octet 3 but in an octet 2. In this case, a size of at least one of the serving cell ID field, the CORESET ID field, and the TCI state ID j field may be limited.

A TCI state notified for a CORESET by the mechanism in Rel. 15/16 may be a 0-th TCI state. The additional TCI state may be notified for the CORESET by the new MAC CE. In this case, up to two additional TCI states per CORESET are notified by the new MAC CE, but three or more additional TCI states may be notified. The number of TCI states (additional TCI states) notified by the new MAC CE and the number of octets of the new MAC CE may be variable depending on the number configured by the higher layer signaling or the number reported through the UE capability.

According to the second embodiment described above, the TCI state for the PDCCH can be appropriately determined.

Third Embodiment

At least one of the first and second embodiments may be applied to only the UE reporting the corresponding UE capability. The UE capability may be defined in Rel. 17, or may be capability for PDCCH multi-TRP (for reliability improvement).

At least one of the first and second embodiments may include a case that two PDCCH candidates with different QCL type D are detected simultaneously by blind detection (for example, in the same symbol). This operation may be applied to only the UE reporting the UE capability indicating that this operation is possible (is supported). The UE capability may be at least one of capabilities 1 to 3 below.

[Capability 1] Capability indicating simultaneous reception of different QCL type D, defined in Rel. 16. Default QCL enhancement for multi-DCI based multi-TRP (support of default QCL assumption per CORESET pool index). Capability (support) of simultaneous reception with different type D (based on a plurality of spatial domain reception filters) (applied to PDCCH/PDSCH).

[Capability 2] Capability for PDCCH multi-TRP defined in Rel. 17.

[Capability 3] Capability indicating simultaneous reception of a plurality of PDCCHs with different QCL type D, defined in Rel. 17.

For PDCCH for multi-TRP, the n-th TRP, the n-th TCI state, the n-th CDM group, the n-th CORESET group, and the n-th CORESET pool may be interchangeably interpreted.

At least one of the first and second embodiments may not be applied (more than one TCI state/QCL assumption may not be configured) to a search space having a search space ID=0 (search space 0) and a search space configured by a PBCH (MIB) or a serving cell common configuration (ServingCellConfigCommon).

At least one of the first and second embodiments may not be applied (more than one TCI state/QCL assumption may not be configured) to CORESET 0 (a CORESET having CORESET ID=0). The CORESET 0 is used for an initial access, but the initial access assumes one QCL (in the specification in Rel. 15), and thus, the CORESET 0 may always include one TCI state/QCL assumption. At least one of the first and second embodiments may be applied to a CORESET other than the CORESET 0.

At least one of the first and second embodiments may be applied to at least one of a UE-specific search space (USS) and a CORESET corresponding thereto. At least one of the first and second embodiments may not be applied to at least one of a common search space (CSS) and a common CORESET.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 17:
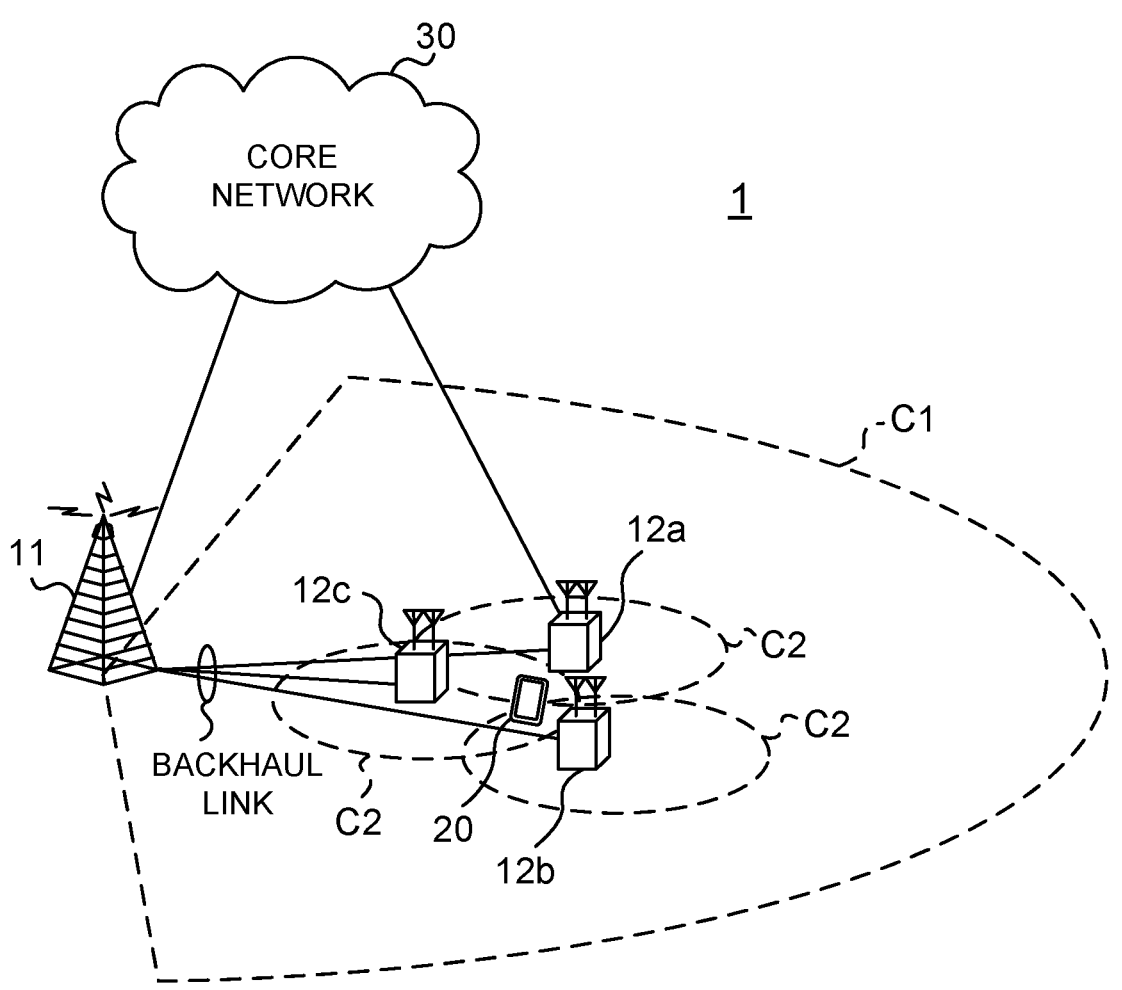
FIG. 17 is a diagram to show an example of a schematic structure of a radio communication system according to one embodiment.

FIG. 17 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 18:
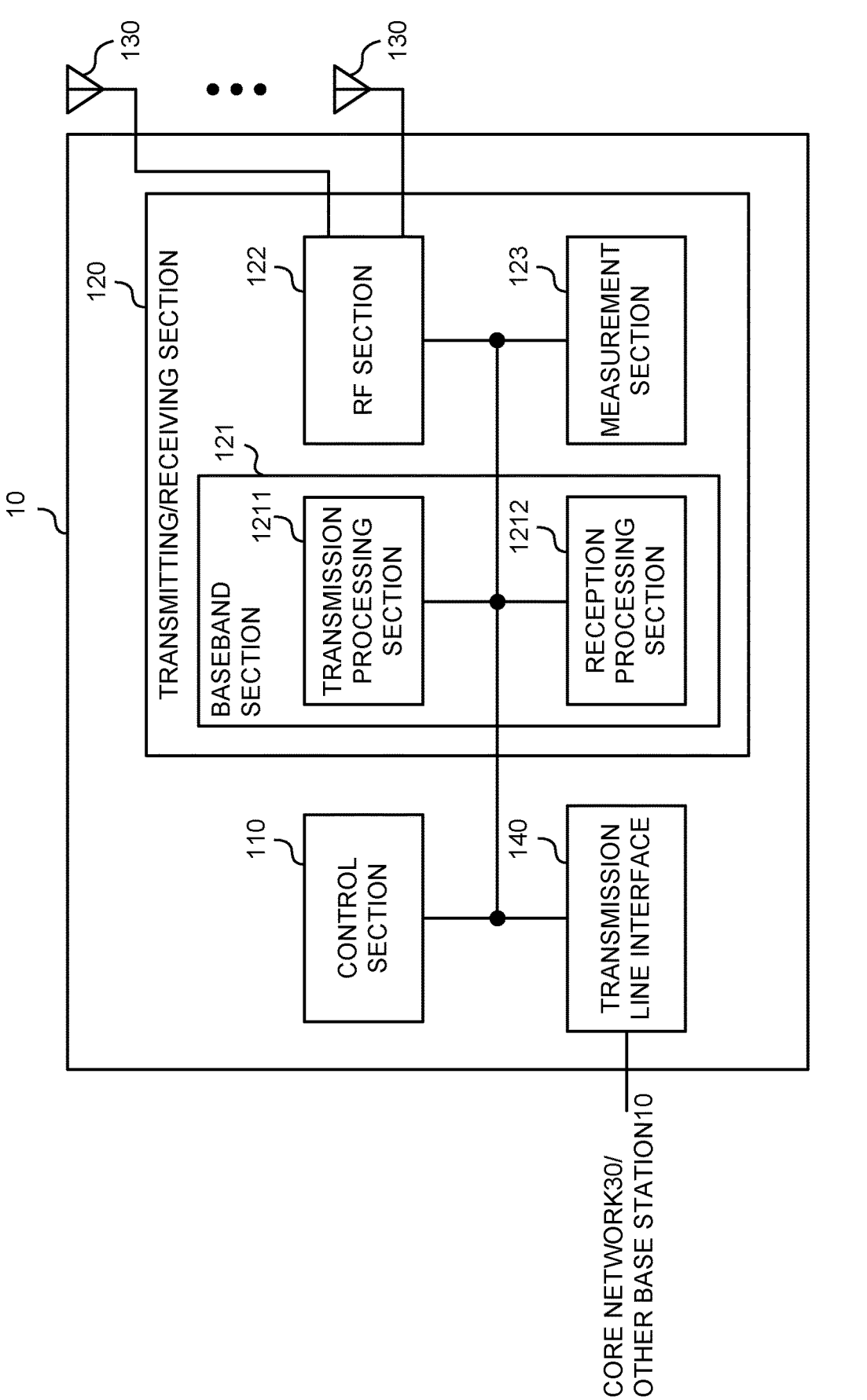
FIG. 18 is a diagram to show an example of a structure of a base station according to one embodiment.

FIG. 18 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RPM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may transmit information associating a plurality of physical downlink control channel (PDCCH) candidates with a plurality of different transmission configuration indication (TCI) states, respectively. The control section 110 may control a PDCCH transmission using a corresponding TCI state.

The transmitting/receiving section 120 may transmit a media access control-control element (MAC CE) associating resources used for the physical downlink control channel (PDCCH) candidates with a plurality of different transmission configuration indication (TCI) states, respectively. The control section 110 may control a PDCCH transmission using a corresponding TCI state.

(User Terminal)

Figure 19:
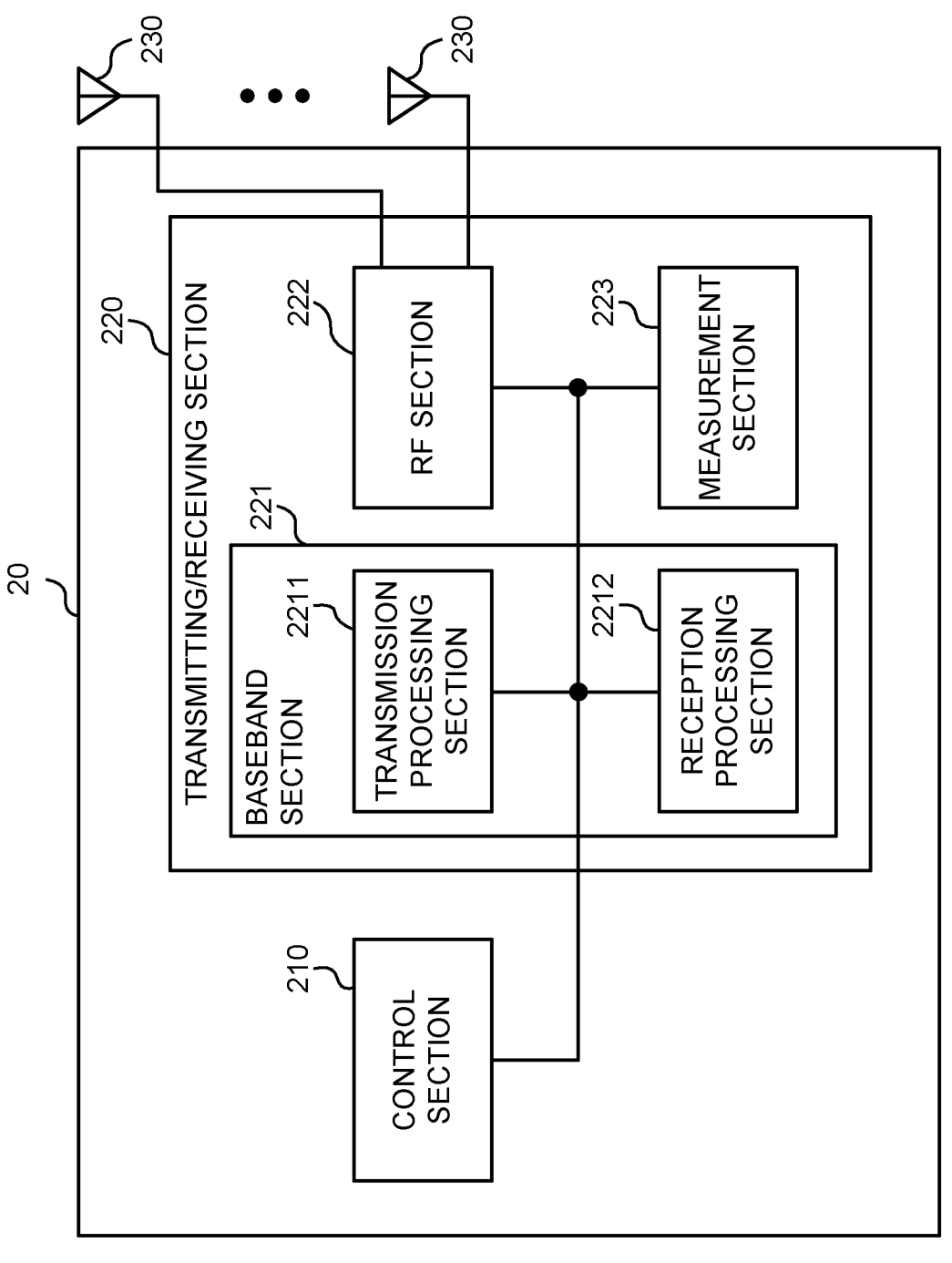
FIG. 19 is a diagram to show an example of a structure of a user terminal according to one embodiment.

FIG. 19 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211 and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220, the transmitting/receiving antennas 230, and the communication path interface 240.

The transmitting/receiving section 220 may receive information associating a plurality of physical downlink control channel (PDCCH) candidates with a plurality of different transmission configuration indication (TCI) states, respectively. The control section 210 may monitor at least one of the plurality of PDCCH candidates by use of a corresponding TCI state, based on the information.

A plurality of sets of resources in one control resource set may be respectively associated with the plurality of different TCI states.

One search space set may be associated with the one control resource set, the one search space set may include a plurality of PDCCH monitoring occasions, and the plurality of PDCCH monitoring occasions may be respectively associated with the plurality of different TCI states.

Two search space sets may be associated with one control resource set, and the two search space sets may include two different TCI states.

The transmitting/receiving section 220 may receive a media access control-control element (MAC CE) associating resources used for the physical downlink control channel (PDCCH) candidates with a plurality of different transmission configuration indication (TCI) states, respectively. The control section 210 may monitor the PDCCH candidate by use of the corresponding TCI state.

The MAC CE may associate one control resource set with the plurality of different TCI states.

The MAC CE may associate one search space set with one of the plurality of different TCI states.

The MAC CE may associate one search space set with the plurality of different TCI states.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining software into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 20:
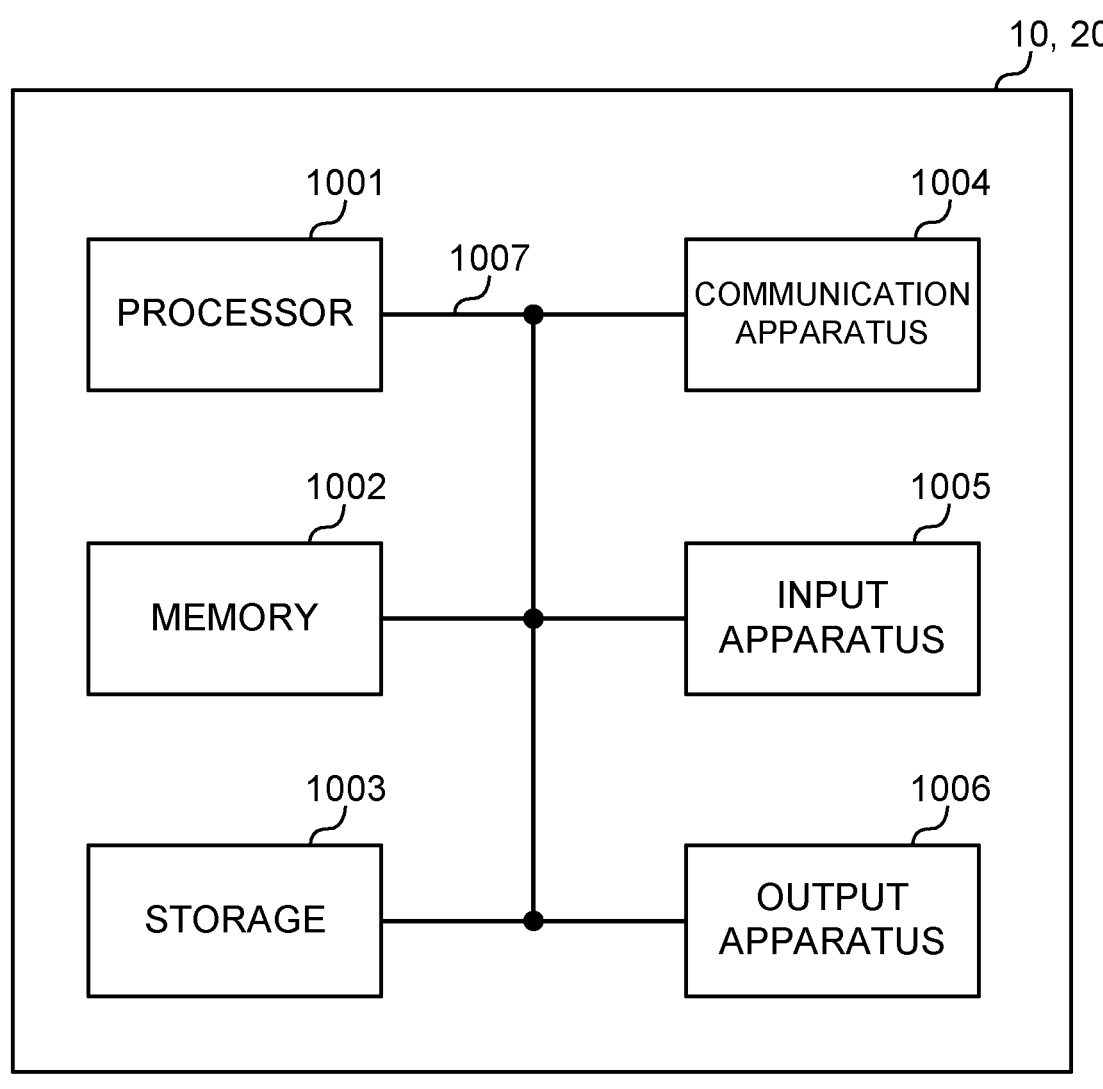
FIG. 20 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 20 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input/output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
a receiver that receives information associating first and second search spaces with first and second different transmission configuration indication (TCI) states which are different from each other, respectively; and
a processor that respectively applies, based on the information, the first and second TCI states to the first and second search spaces, and respectively monitors first and second physical downlink control channel (PDCCH) candidates in the first and second search spaces,
wherein the first and second PDCCH candidates correspond to PDCCH repetitions,
the first and second search spaces correspond to first and second resources, respectively,
the first and second resources overlap each other, and
the first search space has a lowest search space ID among search space IDs corresponding to the first and second resources.

2. The terminal according to claim 1, wherein:
the first and second TCI states have first and second spatial reception parameters, respectively; and
the processor monitors the first and second PDCCH candidates simultaneously.

3. The terminal according to claim 2, wherein the processor controls reporting of a capability indicating support of simultaneously monitoring the first and second PDCCH candidates corresponding to the first and second spatial reception parameters.

4. A radio communication method for a terminal, comprising:
receiving information associating first and second search spaces with first and second transmission configuration indication (TCI) states which are different from each other, respectively; and
respectively applying, based on the information, the first and second TCI states to the first and second search spaces, and respectively monitoring first and second physical downlink control channel (PDCCH) candidates in the first and second search spaces,
wherein the first and second PDCCH candidates correspond to PDCCH repetitions,
the first and second search spaces correspond to first and second resources, respectively,
the first and second resources overlap each other, and
the first search space has a lowest search space ID among search space IDs corresponding to the first and second resources.

5. A base station comprising:
a transmitter that transmits information associating first and second search spaces with first and second transmission configuration indication (TCI) states which are different from each other, respectively; and
a processor that controls at least one transmission of first and second physical downlink control channels (PDCCHs) in the first and second search spaces,
wherein the first and second TCI states are applied to the first and second search spaces, respectively, and
wherein the first and second PDCCHs correspond to PDCCH repetitions,
the first and second search spaces correspond to first and second resources, respectively,
the first and second resources overlap each other, and
the first search space has a lowest search space ID among search space IDs corresponding to the first and second resources.

6. A system comprising a terminal and a base station, wherein the terminal comprises:

a receiver that receives information associating first and second search spaces with first and second transmission configuration indication (TCI) states which are different from each other, respectively; and a processor that respectively applies, based on the information, the first and second different TCI states to the first and second search spaces, and respectively monitors first and second physical downlink control channel (PDCCH) candidates in the first and second search spaces, wherein the first and second PDCCH candidates correspond to PDCCH repetitions, and the base station transmits the information, the first and second search spaces correspond to first and second resources, respectively, the first and second resources overlap each other, and the first search space has a lowest search space ID among search space IDs corresponding to the first and second resources.

* * * * *